INVENTORS
FRANK N. DiMEO

BY

Alfred B. Levine
ATTORNEY

United States Patent Office 3,452,260
Patented June 24, 1969

3,452,260
D.C. SYNCHRO
Frank N. Di Meo, Philadelphia, Pa., assignor to Litton Precision Products, Inc., Clifton Heights, Pa., a corporation of Delaware
Filed Mar. 31, 1966, Ser. No. 539,184
Int. Cl. H02p 1/46, 5/28, 7/36
U.S. Cl. 318—24                                         11 Claims

ABSTRACT OF THE DISCLOSURE

A synchro system having an A.C. synchro transmitter, a D.C. synchro receiver and electronic switching circuits interconnecting the corresponding transmitter and receiver windings to apply a combination of varying amplitude and polarity signals to the receiver windings corresponding to the angular displacement between the rotor and stator in the transmitter.

---

The present invention relates generally to a D.C. synchro system and more particularly to a D.C. synchro system employing a brushless receiver element.

In any rotating electromagnetic device, it is desirable to eliminate brushes, slip rings or the like through which electrical energy is coupled to or from the rotating member. Some of the disadvantages caused by such coupling elements are drag on the rotor, arcing, wear, the need for periodic adjustment and replacement of these coupling means.

The instant invention provides a D.C. synchro system which utilizes a conventional transmitter element but obviates the need for any type of electrical coupling means to the rotor of the synchro receiver. In addition, to obviate the disadvantages mentioned hereinbefore, the instant invention provides the further advantage in that conventional transmitter equipment may be used without having any changes made thereto.

An object of the present invention is the provision of a brushless D.C. synchro receiver.

Yet a further object is the provision of such a receiver which is compatible with conventional transmitter elements.

Other objects and advantages of the invention will become more fully apparent from the following description of an embodiment of the invention as illustrated in the accompanying drawing in which.

Figure 1:
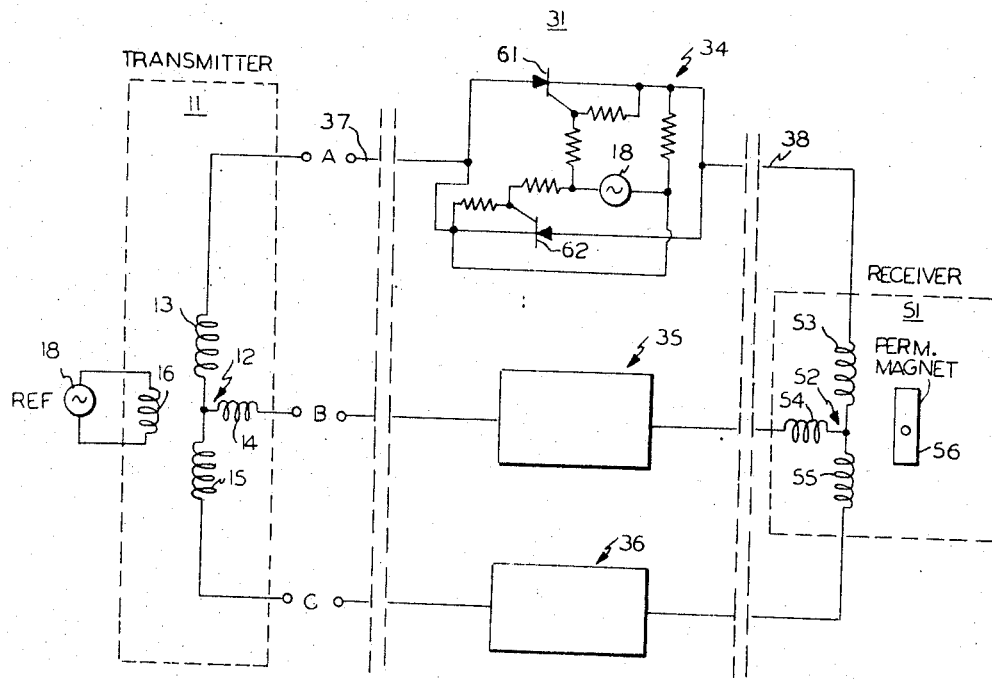
FIG. 1 illustrates in schematic form, an embodiment of the invention.

Turning now to FIG. 1 of the drawing, there is shown a D.C. synchro system having a synchro transmitter 11, gating or switching circuitry 31 and a synchro receiver 51. The transmitter includes a stator element 12 having three windings 13 to 15 connected in a conventional Y configuration and a rotor coil 16. Coil 16 is energized by a suitable source of A.C. voltage 18. The synchro receiver 51 has a like stator element 52 including windings 53 to 55 in conventional Y connection; and a permanent magnet rotor element 56.

The gating circuitry 31 includes three identical gated rectifier circuits 34 to 36 each having an input terminal 37 connected to one of the transmitter windings 13 to 15, respectively, designated A, B, and C, and an output terminal 38 with the output of each circuit being connected to one end of each of the transmitter windings 53 to 55, respectively.

In the embodiment of FIG. 1, the gating circuits each have a first and a second silicon control rectifier (SCR) designated by reference numerals 61 and 62 which are arranged in parallel one with the other between input lead 37 and output lead or terminal 38, and are oppositely poled. The reference source of A.C. voltage 18 which is also used to energize the coil 16 of the transmitter 11, is connected through suitable dropping resistors between the gate and cathode terminals of each of SCR's 61 and 62.

As in a conventional synchro system, the transmitter unit 11 has its rotor energized by the reference source 18. Movement of the rotor 16, which is connected to an input shaft (not shown), the motion of which it is desired be followed by an output shaft (not shown) connected to the receiver rotor 56, causes induced currents in the stator windings 13 to 15 of varying magnitude and polarity relative to one another, dependent upon the coupling of flux between the field created by the current from source 18 through the rotor winding 16 and stator windings 13 to 15. These currents in the secondary, as in a conventional transformer, are dependent upon the magnitude of the varying flux field and the angle of the field relative to the stator windings. The transmitter operates as a conventional three wire synchro transmitter, the operation of which is well known.

The induced currents will flow from the stator along the respective leads to the input terminals 37 of gating circuits 34 to 36. It is obvious that these connections and those leading from the gating system 31 to the receiver 51 need not be actual wired connections as shown, but may be transmitted via a radio link or the like as indicated by the dashed lines.

Thus each of windings 53 to 55 of the receiver receives a pulsating D.C. current, the magnitude and sense of which is dependent upon the position of transmitter rotor 16 relative to stator coils 13 to 15. The current flowing through these receiver coils generates a magnetic flux field emanating from each of the coils. The resultant field has a spatial direction dependent thereupon which acts upon the permanent magnet rotor 56 to align the rotor with this resultant field.

During the positive portion of each cycle of the periodic time varying signal from source 18, a voltage level is reached which is of sufficient magnitude to trigger or gate both the SCR's 61 and 62 into conduction. The SCR's will continue to conduct as long as there is a positive signal from anode to cathode. As soon as zero or a negative signal is applied thereacross, the rectifier will cut off until a further gating signal triggers the device into conduction. If the voltage developed across winding 13 is such that a positive current is induced to flow in lead 37 during the positive excursion of reference source 18, diode 61 will be rendered conductive when the gate magnitude is achieved and a substantially direct current will pass from the transmitter winding 13 through lead 37, SCR 61, output lead 38 to receiver coil 53. When source 18 reaches a zero voltage and starts to traverse through the negative portion of its cycle, the voltage induced in coil 13 will cause a negative flow of current to terminal 37, backbiasing SCR 61 and rendering it nonconductive.

During the positive portion of the cycle of reference source 18 just described, the SCR 62 will also be gated by the current flowing to its gate terminal. However, when the current at terminal 37 is positive and since SCR 62 is connected in the circuit in the opposite sense to SCR 61, only negative current will pass through SCR 62 and the device will not be rendered conductive by the gating current of source 18. Further, since only a positive signal to the gate terminals of the SCR's will render them conductive, the signal developed at the gate terminals during the negative excursion of source 18 will have no effect on SCR's 61 and 62.

If the input shaft (not shown) of transmitter synchro 11 is in a different position causing coupling between windings 16 and 13 to induce a negative current flow at terminal 37 during the positive excursion of source 18, this current will pass through diode 62 following a trigger to its gate terminal and will flow to coil 53. Obviously rectifier 61 will be improperly biased to pass this negative current flow.

Thus depending upon the sense of the coupling between coils 16 and 13, and in a like manner the coupling of coils 16 and 14, and 16 and 15, a substantially D.C. pulsating current will flow through either of SCR's 61 or 62 during a portion of the positive excursion of the signal from source 18.

Figure 2:
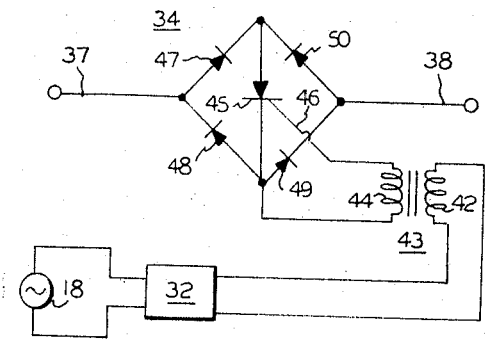
FIG. 2 depicts a schematic diagram of an additional embodiment of the gating circuitry of the device of FIG. 1.

FIG. 2 depicts a schematic diagram of another embodiment of the gating or switching circuits 34 to 36 which may be used in the practice of this invention. As in the embodiment to FIG. 1 each circuit 34 to 36 is identical and hence only one need be shown schematically. These circuits consist of diode bridges having a conventional diode 47 to 50 in each arm thereof. At the junction of diodes 47 and 48 input lead 37 is connected and at the junction of diodes 49 and 50 output lead 38 is connected.

Across the diagonal of the bridge opposite to the input-output terminals, is a silicon controlled rectifier 45. Between the gate terminal 46 and the cathode of the SCR, a secondary winding 44 of an iron core transformer 43 is connected. The primary winding 42 of the transformer is connected across A.C. source 18 through a suitable peaking or trigger circuit 32. The transformer may have a single primary and a three winding secondary, thereby enabling the use of only one transformer and one trigger circuit 32 for the entire complex of circuits 34 to 36.

Once during the positive portion of each cycle of the periodic time varying signal from source 18, a voltage level is reached which is of sufficient magnitude to cause trigger circuit 32 to emit a gating pulse. This pulse is applied across the primary winding 42 of transformer 43 and coupled to the secondary windings 44. The gating lead 46 of rectifier 45 receives this gating pulse and causes the SCR 45 to conduct.

When SCR 45 is rendered conductive, a path is completed from coil 13 to coil 53, through terminal 37, diode 47, SCR 45 and diode 49 to terminal 38 if the signal on lead 37 is positive. If the signal is negative the path is established through diode 48, SCR 45 and diode 50.

As was described hereinbefore in conjunction with the operation of FIG. 1, the SCR will remain conductive only during a portion of the positive excursion of the source 18 for each cycle. Thus, as in the embodiment described above, D.C. pulsating currents of magnitude and polarity depending upon the coupling between coils 16 and each of coils 13 to 15, will flow through coils 53 to 55.

Thus we provide a D.C. synchro system employing a conventional synchro transmitter and a brushless receiver element with all of the advantages of presently known D.C. synchro systems and none of the disadvantages of a system using brushes or other commutative elements.

Although but a few embodiments of a brushless D.C. synchro system utilizing a conventional synchro transmitter has been described, many modifications and variations of the present invention may be made without departing from the spirit and scope of this invention. It is therefore understood, that within the scope of the appended claims, the invention may be practical otherwise than as specifically described.

What is claimed is:

1. A synchro system comprising an A.C. transmitter having a plurality of stator windings and a rotor energized by an A.C. signal; a D.C. receiver having a like plurality of stator windings and a permanent magnet rotor, electronic switching means directly interconnecting the stator windings of the receiver with corresponding stator windings of the transmitter, said electronic switching means responsive to the A.C. signal energizing the transmitter rotor during alternate half cycles thereof to apply half wave D.C. signals of differing amplitude and polarity from all of the transmitted stator windings to all of the receiver stator windings, whereby the receiver windings are energized by a combination of half wave D.C. signals corresponding to the angular displacement between the transmitter rotor and transmitter stator.

2. The system of claim 1 wherein said transmitter stator windings and receiver stator windings are both connected in Y configuration.

3. The system of claim 1 wherein said switching means includes a silicon controlled rectifier.

4. The system of claim 1 wherein each of said transmitter and receiver plurality of windings is connected in a Y configuration and said switching means each includes a plurality of silicon controlled rectifiers.

5. A synchro system comprising: a transmitter having a plurality of stator windings and a rotor winding energizable by an A.C. source; a receiver having a like plurality of stator windings and a permanent magnet rotor; electronic switching means directly interconnecting each of said transmitter stator windings with a corresponding receiver stator winding, said electronic switching means energizable by said A.C. source to intermittently interconnect all of said transmitter windings to all of said receiver windings during alternate half cycles of the A.C. source, whereby each receiver winding is energized by a D.C. signal of differing amplitude and polarity corresponding to the A.C. signal on its corresponding transmitter winding.

6. The system of claim 5 wherein said switching means includes a silicon controlled rectifier.

7. The device of claim 6 wherein said transmitter and receiver plurality of stator windings are connected in Y configuration.

8. The device of claim 7 wherein each of said switching means includes a first and a second silicon controlled rectifier connected in parallel circuit relationship and opposite polarity.

9. A synchro system comprising: a transmitter having a first plurality of stator windings and a rotor winding; a receiver having a plurality of stator windings and a permanent magnet rotor; switching means interconnecting each of said plurality of transmitter windings with a corresponding one of the plurality of receiver windings, each switching means detecting the phase difference between a common A.C. reference signal and its stator winding for applying a D.C. signal of corresponding polarity and amplitude to the receiver winding, said switching means including a silicon controlled rectifier, said first and second plurality of stator windings being connected in Y configuration, each of said switching means including a full wave rectifier bridge having a SCR rectifier connected across a diagonal of said bridge, and means gating said SCR rectifier by said A.C. reference source at half wave intervals.

10. A synchro system comprising: a transmitter having a first plurality of stator windings and a rotor winding energized by an A.C. source; a receiver having a plurality of stator windings and a permanent magnet rotor; switching means interconnecting each of said plurality of transmitter windings with a corresponding one of the plurality of receiver windings, each switching means detecting the phase difference between a common A.C. reference signal and its stator winding for applying a D.C. signal of corresponding polarity and amplitude to the receiver winding, said switching means including a silicon controlled rectifier, said first and second plurality of stator windings being connected in Y configuration, each of said switching means including a first and a second silicon controlled rectifier connected in parallel circuit relationship and opposite polarity, and each of said first and second silicon controlled rectifiers being commonly gated by said reference source.

11. A D.C. synchro receiver system comprising a synchro receiver having a stator with a series of stator windings and a rotatable rotor free of sliprings and commutators and producing a D.C. magnetic field, electronic switching means connected to each winding of the stator, a plurality of conductors with one for each stator winding, each connected to a corresponding switching means, each conductor energizable by an A.C. signal of differing polarity and magnitude wherein each combination of A.C. signals on said conductors corresponds to a different angular position of the rotor, means for intermittently and repetitively actuating all of said switching means in unison for time intervals less than the period of A.C. signals on said conductors, thereby to simultaneously apply intermittent D.C. signals of differing amplitude and polarity to all of said stator windings and rotatably position said rotor corresponding to the combined signals.

References Cited

UNITED STATES PATENTS

| | | | |
|---|---|---|---|
| 2,632,136 | 3/1953 | Schmitt | 318—23.5 |
| 3,327,185 | 6/1967 | Kawada | 318—23.5 |

BENJAMIN DOBECK, *Primary Examiner.*